United States Patent
Melchiors et al.

(10) Patent No.: US 6,927,254 B2
(45) Date of Patent: Aug. 9, 2005

(54) POLYURETHANE RESIN WITH HIGH CARBONATE GROUP CONTENT

(75) Inventors: Martin Melchiors, Leichlingen (DE); Thomas Münzmay, Dormagen (DE); Torsten Pohl, Köln (DE); Uwe Klippert, Burscheid (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/701,908

(22) Filed: Nov. 5, 2003

(65) Prior Publication Data

US 2004/0204559 A1 Oct. 14, 2004

(30) Foreign Application Priority Data

Nov. 7, 2002 (DE) .......................................... 102 51 797

(51) Int. Cl.$^7$ .............................................. C08G 18/44
(52) U.S. Cl. .......................... 524/840; 528/71; 528/85; 525/458
(58) Field of Search ............................ 524/840; 528/71, 528/85; 525/458

(56) References Cited

U.S. PATENT DOCUMENTS

| | | | |
|---|---|---|---|
| 4,108,814 A | 8/1978 | Reiff et al. .......... | 260/29.2 TN |
| 4,237,264 A | 12/1980 | Noll et al. ..................... | 528/67 |
| 4,808,691 A | 2/1989 | König et al. ................... | 528/76 |
| 5,047,294 A | 9/1991 | Schwab et al. .......... | 428/432.1 |
| 5,057,370 A | 10/1991 | Krieg et al. ................ | 524/591 |
| 5,126,393 A | 6/1992 | Blum et al. ................. | 524/538 |
| 5,252,696 A | 10/1993 | Laas et al. .................... | 528/49 |
| 5,349,041 A | 9/1994 | Blum et al. .................. | 528/85 |
| 5,354,397 A | 10/1994 | Miyake et al. ................ | 156/77 |
| 5,569,707 A | 10/1996 | Blum et al. ................. | 524/591 |
| 5,880,215 A | 3/1999 | Shaffer et al. .............. | 524/839 |
| 6,426,414 B1 | 7/2002 | Laas et al. ................... | 544/222 |
| 6,635,723 B1 * | 10/2003 | Maier et al. ................ | 525/459 |
| 2001/0014715 A1 | 8/2001 | Blum et al. ................. | 524/591 |

FOREIGN PATENT DOCUMENTS

| | | |
|---|---|---|
| DE | 100 07 821 | 8/2001 |
| DE | 100 24 624 | 11/2001 |
| GB | 1128568 | 9/1968 |

OTHER PUBLICATIONS

Lackkunstharze, Carl Hanser Verlag Munchen, (month unavailable) 1971, Dr. Ernst Schneider, "Polyaddition-sharze", pp. 153–194.

* cited by examiner

*Primary Examiner*—Rachel Gorr
(74) *Attorney, Agent, or Firm*—Joseph C. Gil

(57) ABSTRACT

The invention relates to solvent-borne polyurethane resins with a high carbonate group content which are dilutable in water, to aqueous coating compositions prepared thereof, to a process for preparing them and to their use.

8 Claims, No Drawings

POLYURETHANE RESIN WITH HIGH CARBONATE GROUP CONTENT

CROSS REFERENCE TO RELATED PATENT APPLICATION

The present patent application claims the right of priority under 35 U.S.C. § 119 (a)–(d) of German Patent Application No. 102 51 797.5, filed Nov. 7, 2002.

FIELD OF THE INVENTION

The invention relates to solvent borne polyurethane resins with a high carbonate group content which are dilutable in water, to aqueous coating compositions prepared thereof, to a process for preparing them and to their use.

BACKGROUND OF THE INVENTION

"Soft-feel effect" in the context of the present invention refers to a particular touch sensation (haptic quality) of the coated surface. This haptic quality can be expressed by terms such as velvety, soft, rubber-like or warm, whereas, say, the surface of the coated car body or else a plastic sheet (e.g. ABS, Makrolon) or plexiglass, uncoated or coated with a conventional clearcoat or topcoat material, feels smooth and cold. EP-A 0 529 094 describes, for example, a solvent-based surface coating with soft-feel effect, the haptic quality there being achieved through the combination of a urethane resin with elastic particles or with a porous inorganic material.

Modern aqueous coating compositions are capable of substituting for binders in organic solution in many applications. However, for certain applications with specific profiles of requirements, such as the coating of substrates, and more particularly plastics substrates, with soft-feel effect coating materials, for example, there has to date been a lack of aqueous binders which meet all of the requirements imposed, particularly those concerning the resistance properties of the films. Thus, for example, EP-A 0 358 979 describes aqueous two-component reactive polyurethane systems based on secondary dispersions of vinyl polymer and on polyisocyanate crosslinkers, which already have a good level of properties, particularly as far as resistance to solvents and other chemicals is concerned. Nevertheless the target haptic quality of soft feel cannot be achieved with these coating compositions.

EP-A 0 669 352 describes special aqueous polyester-polyurethane dispersions which, in combination with crosslinker resins and, where appropriate, with linear, hydroxyl-free polyurethane dispersions, can be cured to give coatings having a good soft-feel effect, good mechanical properties, and a generally satisfactory solvent resistance. For certain applications, however, the resistance, particularly the resistance to suntan lotion, are still in need of improvement.

EP-A 0 926 172 describes aqueous two-component (2K) polyurethane coating materials in which the resistance to suntan lotion (which penetrates the film, causing delamination and/or other damage) can be improved by using special ester-modified polyisocyanates. The binders used in that case are mixtures of carboxylate- and/or sulfonate-hydrophilicized polyester polyol dispersions with physically drying, carboxylate- and/or sulfonate-hydrophilicized polyurethane dispersions.

An object of the present invention was to provide a new polyurethane resin which can be processed to aqueous coating compositions which have good resistance, particularly to damage caused by exposure to suntan lotion, and at the same time, in the form of the film, had a pronounced soft-feel effect. The polyurethane resins ought also to be readily processable with the commercially available hydrophilicized or unhydrophilicized polyisocyanates to form coating systems.

SUMMARY OF THE INVENTION

The present invention is directed to a water-dilutable polyurethane resin obtained by reacting A1) at least one polycarbonate polyol with a number average molecular weight of from 400 to 6000 Da, A2) optionally, a polyester polyol which is different from component (A1) with a number-average molecular weight $M_n$ of from 400 to 6000 Da, A3) optionally, a low molecular weight compound containing two or more hydroxy and/or amino groups having a molecular weight of from 60 to 400 Da, A4) optionally, a compound which is monofunctional in terms of reaction with isocyanate groups or which contains active hydrogen atoms differing in reactivity, these units being located at the end of the polymer chain, A5) at least one compound containing at least two isocyanate-reactive groups and at least one group capable of forming anions, and A6) one or more polyisocyanates.

The resulting polyurethane resin contains from 5.8% to 20.0% by weight of incorporated carbonate groups —O(C=O)O— and is present in a solvent which is inert towards isocyanate groups.

The present invention is also directed to an aqueous coating system comprising:

a) at least one non-aqueous component comprising the above-described water-dilutable polyurethane resin, b) one or more aqueous binder components comprising at least one hydroxyl-free polyurethane dispersion, c) optionally, auxiliaries and additives and d) at least one crosslinker component.

The present invention is further directed to substrates coated using the above-described aqueous coating system.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

The present invention provides a water-dilutable polyurethane resin obtainable by reacting:

A1) at least one polycarbonate polyol whose molecular weight $M_n$ is from 400 to 6000 Da, A2) if desired, a polyester polyol which is different from component (A1) and whose number-average molecular weight $M_n$ is from 400 to 6000 Da, A3) if desired, a low molecular weight compound which contains two or more hydroxy and/or amino groups and whose molecular weight is from 60 to 400 Da, A4) if desired, a compound which is monofunctional in terms of reaction with isocyanate groups or which contains active hydrogen atoms differing in reactivity, these units being located in each case at the chain end of the polymer containing urethane groups, A5) at least one compound containing at least two isocyanate-reactive groups and at least one group capable of forming anions, and A6) one or more polyisocyanates, the resultant polyurethane resin containing from 5.8 to 20.0% by weight, in some cases from 7.0 to 14.0% by weight, and in other cases from 8.0 to 12.0% by weight of incorporated carbonate groups O(C=O)O and being present in a solvent which is inert towards isocyanate groups.

The water-dilutable polyurethane resins of the invention possess in general an average molecular weight $M_n$ of from 1000 to 30 000 Da, in some cases from 1500 to 10 000 Da, an acid number of from 10 to 80, in some cases from 15 to 40 mg KOH/g, and an OH content of from 0.5 to 5% by weight, in some cases from 1.0 to 3.5% by weight. The solids content of the polyurethane resins of the invention is at least 50% by weight, in some cases at least 70% by weight and in other cases from 75 to 90% by weight. The remainder to 100% by weight is composed of solvents inert towards isocyanate groups and, where appropriate, of customary coatings auxiliaries and additives.

The invention likewise provides an aqueous coating system comprising:

a) at least one non-aqueous component comprising the water-dispersible polyurethane resins of the invention, b) one or more aqueous binder components comprising at least one hydroxyl-free, preferably anionically and/or nonionically hydrophilicized polyurethane dispersion, c) optionally auxiliaries and additives and d) at least one crosslinker component.

"Hydroxyl-free" means, for the purposes of the present invention, that the polyurethane carries no hydroxyl groups, with the exception of the terminal groups of the polymer chains. Because of the comparatively high molecular weight (compared to the water-dilutable polyurethane resin of the invention) the concentration of the terminal groups is low, corresponding to an OH content <0.5% by weight; customarily <0.2% by weight.

The present invention further provides a process for preparing aqueous coating systems, characterized in that the water-dilutable polyurethane resin of the invention is incorporated into an aqueous phase comprising at least one hydroxyl-free aqueous polyurethane dispersion and, if desired, auxiliaries and additives and subsequently at least one crosslinker component and also, if desired, further auxiliaries and additives are dispersed into this aqueous stock varnish.

The polyurethane resins of the invention have been synthesized from:

A1) from 25 to 80% by weight, in some cases from 30 to 70% by weight of at least one polycarbonate polyol whose molecular weight $M_n$ is from 400 to 6000 Da and which has a carbonate group content of at least 10% by weight, A2) from 0 to 60% by weight, in some cases from 10 to 50% by weight and at least one polyester polyol which is different from component (A1) and has a number-average molecular weight $M_n$ of from 400 to 6000 Da, A3) from 0 to 20% by weight, in some cases from 1 to 15% by weight of at least one low molecular weight compound which contains two or more hydroxyl and/or amino groups and has a molecular weight of from 60 to 400 Da, A4) from 0 to 10% by weight, in some cases 0% by weight of at least one compound which is monofunctional in terms of reaction with NCO groups or contains active hydrogen atoms differing in reactivity, these units being located in each case at the chain end of the polymer containing urethane groups, A5) from 2 to 10% by weight, in some cases from 3 to 8% by weight of at least one compound containing at least two isocyanate-reactive groups and at least one group capable of forming anions, and A6) from 5 to 50% by weight, in some cases from 8 to 30% by weight of one or more polyisocyanates, the sum of the components being 100% by weight.

Component (A1) suitably comprises hydroxyl-containing polycarbonates whose molecular weight $M_n$ is 400 to 6000 Da, in some cases from 600 to 3000 Da, and which are obtainable, for example, by reacting carbonic acid derivatives, e.g. diphenyl carbonate, dimethyl carbonate or phosgene, with polyols, and in some cases diols. Examples of suitable such diols include ethylene glycol, 1,2- and 1,3-propanediol, 1,3- and 1,4-butanediol, 1,6-hexanediol, 1,8-octanediol, neopentylglycol, 1,4-bishydroxymethylcyclohexane, 2-methyl-1,3-propanediol, 2,2,4-trimethylpentane-1,3-diol, dipropylene glycol, polypropylene glycols, dibutylene glycol, polybutylene glycols, bisphenol A, tetrabromobisphenol A, and also lactone-modified diols. The diol component contains preferably from 40 to 100% by weight of hexanediol, preferably 1,6-hexanediol and/or hexanediol derivatives, preferably those which in addition to terminal OH groups contain ether groups or ester groups, examples being products obtained by reacting 1 mol of hexanediol with at least 1 mol, in some cases 1 to 2 mol, of caprolactone or by etherifying hexanediol with itself to give dihexylene or trihexylene glycol. Additionally the polyether-polycarbonate diols described in DE-A 37 17 060 (page/lines please) can be employed.

The hydroxyl polycarbonates (A1) are preferably linear. They may, however, be slightly branched where appropriate through the incorporation of polyfunctional components, especially low molecular weight polyols. Compounds suitable for this purpose include for example glycerol, trimethylolpropane, hexane-1,2,6-triol, butane-1,2,4-triol, trimethylolethane, pentaerythritol, quinitol, mannitol, and sorbitol, methylglycoside or 1,3,4,6-dianhydrohexitols.

Polyester polyols which can be used as component (A2) have a molecular weigh $M_n$ of from 400 to 6000 Da, in some cases from 600 to 3000 Da. Their hydroxyl number is generally from 22 to 400, in some cases from 50 to 200 and in other cases from 80 to 160 mg KOH/g. The OH functionality is in the range from 1.5 to 6, in some cases from 1.8 to 3, and in other cases from 1.9 to 2.5.

Highly suitable compounds are the conventional polycondensates of diols and also, where appropriate, polyols (triols, tetraols) and dicarboxylic and also, where appropriate, polycarboxylic (tricarboxylic, tetracarboxylic) acids or hydroxycarboxylic acids or lactones. Instead of the free polycarboxylic acids it is also possible to use the corresponding polycarboxylic anhydrides or corresponding polycarboxylic esters of lower alcohols to prepare the polyesters. Examples of suitable diols are ethylene glycol, butylene glycol, diethylene glycol, triethylene glycol, polyalkylene glycols such as polyethylene glycol, and also propanediol or butane-1,4-diol, preference being given to hexane-1,6-diol, neopentylglycol or neopentylglycol hydroxypivalate. If desired it is also possible to use polyols such as trimethylolpropane, glycerol, erythritol, pentaerythritol, trimethylolbenzene or trishydroxyethyl isocyanurate, for example, as well.

Examples of suitable dicarboxylic acids are phthalic acid, isophthalic acid, terephthalic acid, tetrahydrophthalic acid, hexahydrophthalic acid, cyclohexane dicarboxylic acid, adipic acid, azeleic acid, sebacic acid, glutaric acid, tetrachlorophthalic acid, maleic acid, fumaric acid, itaconic acid, malonic acid, suberic acid, 2-methyl succinic acid, 3,3-diethylglutaric acid, 2,2-dimethyl succinic acid. The possible anhydrides of these acids are likewise suitable. In the content of the present invention the anhydrides are always embraced by "acid".

It is also possible to use monocarboxylic acids, such as benzoic acid and hexanecarboxylic acid, provided that the average functionality of the polyol is greater than 2. Saturated aliphatic or aromatic acids are preferred, such as adipic acid or isophthalic acid. If desired it is also possible to use relatively small amounts of polycarboxylic acid as well, such as trimellitic acid.

Hydroxycarboxylic acids which can be used as reaction participants in the preparation of a polyester polyol having terminal hydroxyl groups are for example hydroxycaproic acid, hydroxybutyric acid, hydroxydecanoic acid, hydroxystearic acid and the like. Suitable lactones are, for example, caprolactone or butyrolactone.

Compounds of component (A2) may also include, at least proportionally, primary or secondary amino groups as isocyanate-reactive groups.

The low molecular weight polyols (A3) are used in general for the purpose of stiffening and/or branching the polymer chain. The molecular weight is in the range from 60 to 400 Da, in some cases from 62 to 200 Da. They can contain aliphatic, cycloaliphatic or aromatic groups. Suitable polyols (A3) are compounds having up to about 20 carbons per molecule, such as ethylene glycol, diethylene glycol, triethylene glycol, 1,2-propanediol, 1,3-propanediol, 1,4-butanediol, 1,3-butylene glycol, cyclohexanediol, 1,4-cyclohexanedimethanol, 1,6-hexanediol, hydro-quinone dihydroxyethyl ether, bisphenol A [2,2-bis(4-hydroxyphenyl)propane], hydrogenated bisphenol A (2,2-bis(4-hydroxycyclohexyl)propane) and also mixtures thereof, and also trimethylolpropane, glycerol or pentaerythritol. Ester diols as well, such as δ-hydroxybutyl-ε-hydroxycaproic esters, ω-hydroxyhexyl-γ-hydroxybutyric esters, adipic acid β-hydroxyethyl esters or terephthalic acid bis(β-hydroxyethyl) ester, for example, can be used.

Diamines or polyamines and also hydrazides can likewise be used as (A3), examples being ethylenediamine, 1,2- and 1,3-diaminopropane, 1,4-diaminobutane, 1,6-diaminohexane, isophoronediamine, the isomer mixture of 2,2,4- and 2,4,4-trimethylhexamethylenediamine, 2-methylpentamethylene-diamine, diethylenetriamine, 1,3- and 1,4-xylylenediamine, α,α,α',α'-tetramethyl-1,3- and -1,4-xylylenediamine and 4,4'-diaminodicyclohexylmethane, dimethyl-ethylenediamine, hydrazine or adipic dihydrazide. Component (A3) preferably contains at least 2% by weight, based on components (A1) to (A6), of at least one compound which has a functionality of three or more in respect of reaction with NCO groups.

The polyurethane resin may where appropriate also include units (A4) which are each located at the chain ends, and cap them. These units are derived on the one hand from monofunctional, isocyanate-reactive compounds, such as monoamines, especially mono-secondary amines, or monoalcohols. Mention may be made here by way of example of methylamine, ethylamine, propylamine, butylamine, octylamine, laurylamine, stearylamine, isononyloxypropylamine, dimethylamine, diethylamine, dipropylamine, dibutylamine, N-methylaminopropylamine, diethyl(methyl)aminopropylamine, morpholine, piperidine or the substituted derivatives thereof, amido amines from diprimary amines and monocarboxylic acids, monoketimines of diprimary amines, primary/tertiary amines, such as N,N-dimethylaminopropylamine, for example.

Likewise suitable as component (A4) are compounds containing active hydrogen atoms which differ in reactivity towards isocyanate groups, such as compounds which in addition to a primary amino group also contain secondary amino groups or in addition to an OH group also contain COOH groups or in addition to an amino group (primary or secondary) also contain OH groups. Preference is given to compounds (A4) which in addition to an amino group (primary or secondary) also contain OH groups. Examples of such are primary/secondary amines, such as 3-amino-1-methylaminopropane, 3-amino-1-ethylaminopropane, 3-amino-1-cyclohexylaminopropane, 3-amino-1-methylaminobutane; mono-hydroxy-carboxylic acids, such as hydroxyacetic acid, lactic acid or malic acid, and also alkanolamines such as N-aminoethylethanolamine, ethanolamine, 3-amino-propanol, neopentanolamine, and, with particular preference, diethanolamine. In this way it is possible additionally to introduce functional groups into the polymer end product.

Ionic or potentially ionic compounds suitable as component (A5) include for example mono- and dihydroxycarboxylic acids, mono- and diaminocarboxylic acids, mono- and dihydroxysulfonic acids, mono- and diaminosulfonic acids and salts thereof such as dihydroxycarboxylic acids, hydroxypivalic acid, N-(2-aminoethyl)-β-alanine, 2-(2-aminoethylamino)ethanesulfonic acid, ethylene-diamine-propyl- or butylsulfonic acid, 1,2- or 1,3-propylenediamine-β-ethylsulfonic acid, lysine, 3,5-diaminobenzoic acid, the hydrophilicizing agent according to Example 1 from EP-A 0 916 647 and its alkali metal salts and/or ammonium salts; the adduct of sodium bisulfite with but-2-ene-1,4-diol polyethersulfonate or the propoxylated adduct of 2-butenediol and $NaHSO_3$ (e.g. in DE-A 2 446 440, page 5–9, formula I–III). Preferred ionic or potential ionic compounds (A5) are those which possess carboxyl and/or carboxylate groups. Particularly preferred ionic compounds (A5) are dihydroxycarboxylic acids, especially α,α-dimethylolalkanoic acids, such as 2,2-dimethylolacetic acid, 2,2-dimethylolpropionic acid, 2,2-dimethylolbutyric acid, 2,2-dimethylolpentanoic acid or dihydroxysuccinic acid.

The polyurethane resins of the invention are preferably free from sulfonic acid groups.

The components (A1) to (A5) may also contain C=C double bonds, which come, for example, from long-chain aliphatic carboxylic acids or fatty alcohols. Functionalization with olefinic double bonds is also possible, for example, by the incorporation of allylic groups or of acrylic acid or methacrylic acid and also their respective esters.

Furthermore, components (A1) to (A5) may also contain compounds having a nonionically hydrophilicizing activity, examples being polyoxyalkylene ethers having at least one hydroxyl or amino group. These polyethers include a fraction of from 30% by weight to 100% by weight of units derived from ethylene oxide. They suitably include polyethers of linear construction with a functionality of between 1 and 3, but also compounds of the general formula (I)

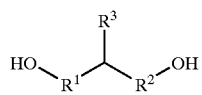
(I)

in which
- $R^1$ and $R^2$ independently of one another are each a divalent aliphatic, cycloaliphatic or aromatic radical having 1 to 18 carbon atoms, which can be interrupted by oxygen and/or nitrogen atoms, and
- $R^3$ is a non-hydroxy-terminated polyester or, preferably, polyether, in particular an alkoxy-terminated polyethylene oxide radical.

Examples of polyisocyanates suitable as component (A6) include diisocyanates with molecular weights in the range from 140 to 400, containing aliphatically, cycloaliphatically, araliphatically and/or aromatically attached isocyanate groups, such as 1,4-diisocyanatobutane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)isocyanatomethylcyclohexane, bis(isocyanatomethyl)norbornane, 1,3- and 1,4-bis(2-isocyanato-prop-2-yl)benzene (TMXDI), 2,4- and 2,6-diisocyanatotoluene (TDI), 2,4'- and 4,4'-diisocyanatodiphenylmethane, 1,5-diisocyanatonaphthalene or any desired mixtures of such diisocyanates. Preference is given to polyisocyanates or polyisocyanate mixtures of the stated kind containing exclusively aliphatically and/or cycloaliphatically attached isocyanate groups. Particularly preferred starting components (A6) are polyisocyanates or polyisocyanate mixtures based on HDI, IPDI and/or 4,4'-diisocyanatodicyclohexylmethane.

Besides these simple diisocyanates, suitability extends to those polyisocyanates which contain heteroatoms in the radical linking the isocyanate groups and/or which possess a functionality of more than 2 NCO groups per molecule. The former are polyisocyanates which are prepared, for example, by modifying simple aliphatic, cycloaliphatic, araliphatic and/or aromatic diisocyanates, are synthesised from at least 2 diisocyanates, and have a uretdione, isocyanurate, urethane, allophanate, biuret, carbodiimide, iminooxadiazinedione and/or oxadiazinetrione structure; one example that may be mentioned of a non-modified polyisocyanate having more than 2 NCO groups per molecule is 4-isocyanatomethyloctane 1,8-diisocyanate (nonane triisocyanate).

Likewise provided by the invention is a process for preparing the polyurethane resins of the invention, characterized in that an OH- and/or NH-functional polyurethane is prepared from components (A1), (A5) and (A6) and also, if desired, components (A2) to (A4) in a solvent which is inert towards isocyanate groups.

The water-dilutable polyurethane resins of the invention can be prepared, for example, by first preparing an isocyanate-functional prepolymer from component (A6) and components (A1) and (A5) and, if desired, (A2), (A3) or (A4) and, in a second reaction step, by reaction with one or more of the compounds (A3), (A4) or if desired, (A2) in a solvent medium which is inert towards NCO groups, obtaining an OH- and NH-functional polyurethane, as described for example in EP-A 0 355 682, p. 4, lines 39–45.

In one preferred embodiment preparation takes place by forming the OH- and/or NH-containing polyurethane resin directly by reacting the components (A1) to (A6) in a non-aqueous medium, as described for example in EP-A 0 427 028, p. 4, line 54–p. 5, line 1.

The urethanization reaction in the preparation of the prepolymer is normally conducted at temperatures from 0° to 140° C., depending on the reactivity of the isocyanate used. In order to accelerate the urethanization reaction it is possible to use suitable catalysts, such as are known for the acceleration of the NCO—OH reaction to the person skilled in the art. Examples are tertiary amines such as triethylamine, for example, organotin compounds such as dibutyltin oxide, dibutyltin dilaurate or tin bis(2-ethylhexanoate), for example, or other organometallic compounds.

The urethanization reaction is preferably conducted in the presence of solvents which are inactive towards isocyanate groups. Particularly suitable for this purpose are those solvents which are compatible with water, such as ethers, ketones and esters, and also N-methylpyrrolidone, for example. The amount of this solvent appropriately does not exceed 30% by weight and is in some cases in the range from 10 to 25% by weight, based in each case on the sum of polyurethane resin and solvent. The polyisocyanate (A6) can be added swiftly to the solution of the other components.

The acid groups incorporated in the polyurethane resin by component (A5) can at least proportionally be neutralized. Particularly suitable for the neutralization are tertiary amines, examples being trialkylamines having 1 to 12, in some cases 1 to 6, carbon atoms in each alkyl radical. Examples thereof are trimethylamine, triethylamine, methyldiethylamine, tripropylamine and diisopropylethylamine. The alkyl radicals may, for example, also carry hydroxyl groups, as in the case of the dialkylmonoalkanol-, alkyldialkanol- and trialkanolamines. An example of such is dimethylethanolamine, which serves preferably as neutralizing agent. As neutralizing agent it is also possible where appropriate to use inorganic bases, such as ammonia or sodium or potassium hydroxide. The neutralizing agent is used in a molar ratio to the acid groups of the prepolymer of from 0.3:1 to 1.3:1, in some cases from 0.4:1 to 1:1.

The free COOH groups of the polyurethane resin of the invention can be neutralized before, during or after the urethanization reaction. The neutralizing step is preferably conducted following the urethanization reaction, generally of between room temperature and 80° C., in some cases between 40 to 80° C. It is also possible to provide the water-dilutable polyurethane resin in a non-neutralized form and to carry out the neutralization not until during the preparation of the aqueous coating composition: for example, when incorporating the water-dilutable polyurethane resin of the invention into the OH-free polyurethane dispersion(s).

If desired it is possible during the preparation of the polyurethane resin of the invention, for the purpose of hydrophilicization, to add, in addition to the acid groups, and proportionally, monomer units containing alkylene oxide, in incorporated form, or else external emulsifiers. The external emulsifiers which can be used in this context are anionic and/or non-ionic in nature. Of the anionic emulsifiers, those having carboxylate groups, sulfate, sulfonate, phosphate or phosphonate groups can be used. Preferred emulsifiers have sulfate, sulfonate, phosphate or phosphonate groups. Suitable non-ionogenic external emulsifiers, which can be employed generally in combination with the above-mentioned anionic emulsifiers, include reaction products of aliphatic, araliphatic, cycloaliphatic or aromatic carboxylic acids, alcohols, phenol derivatives and/or amines with epoxides, such as ethylene oxide, for example. Examples thereof are reaction products of ethylene oxide with carboxylic acids of castor oil, abiatic acid, with relatively long-chain alcohols such as oleyl alcohol, lauryl alcohol, stearyl alcohol, with phenol derivatives such as substituted benzyl-, phenyl-phenols, nonylphenols, for example, and with relatively long-chain amines such as dodecylamine and stearylamine, for example. The reaction products with ethylene oxide are oligoethers or polyethers having degrees of polymerization of between 2 and 100, in some cases between 5 and 50. The external emulsifiers can be added in amounts of from 0.1 to 10% by weight, based on the non-volatile fraction of the water-dilutable polyurethane resin, to the water-dilutable polyurethane resin or to another component of the aqueous coating system. In some cases, however, only acid groups are used, in a purely internal hydrophilicization.

The aqueous coating systems are preferably prepared such that the non-aqueous component, comprising the polyurethane resin of the invention, is incorporated under shearing into an aqueous binder component. Then, in a second step under shearing, the crosslinker component, which in some cases comprises a polyisocyanate having free NCO groups, is incorporated into the aqueous stock varnish thus obtained. The customary coatings auxiliaries and additives can be incorporated into the finished aqueous coating material either together with the crosslinker component, with the binder components, or subsequently.

Hydroxyl-free polyurethane dispersions (B) are well known in coatings technology. Preference is given, for example, to the linear, comparatively (compared to the water-dilutable polyurethane resin of the invention) high molecular weight polyurethane dispersions described in DE-A 26 51 506 (P. 6, lines 1–13) or in DE-A 1 570 615 (p. 2, line 9–p. 3, line 3).

In one preferred embodiment of the aqueous coating systems, comprising the polyurethanes of the invention, hydroxyl-free polyurethane dispersions are used which in addition to non-ionic, hydrophilic groups in the form of polyethylene oxide units also contain anionic groups, preferably carboxylate and/or sulfonate groups, more preferably sulfonate groups, and especially their alkali metal salts, as hydrophilic groups. In the selection of the base materials it should be ensured that the resulting amount of nonionic hydrophilic groups in the form of polyethylene oxide units is between 0.1 and 10% by weight, in some cases between 1 to 7% by weight, based on resin solids, and the amount of ionic groups is from 2 to 20, in some cases from 2.5 to 15 mmol/100 g resin solids. In one particularly preferred embodiment hydroxyl-free polyurethane dispersions are used with a cosolvent content of from 0.5 to 20% by weight, in some cases from 1 to 10% by weight and in other cases from 2.5 to 8% by weight.

Suitable cosolvents are those already described above, preference being given to N-methylpyrrolidone. The addition of the cosolvents can be added at any desired point in time during the operation of preparing the hydroxyl-free polyurethane dispersions.

The aqueous coating systems comprising the polyurethane resins of the invention can where appropriate also contain other binders or dispersions, based for example on polyesters, polyurethanes, polyethers, polyepoxides or polyacrylates, and, where appropriate, pigments and other auxiliaries and additives that are known in the coatings industry.

Through combination with crosslinkers it is possible, depending on the reactivity or, where appropriate, blocking of the crosslinkers, to prepare both one-component (1K) and two-component (2K) coating materials. 1K coating materials for the purposes of the present invention are coating materials in which binder component and crosslinker component can be stored together without any crosslinking reaction taking place to a marked extent or to an extent which is detrimental to the subsequent application. The crosslinking reaction takes place only on application, after the crosslinker has been activated. This activation can be effectuated, for example, by raising the temperature. 2K coating materials for the purposes of the present invention are coating materials in which binder component and crosslinker component have to be stored in separate vessels owing to their high reactivity. The two components are not mixed until shortly prior to application, when they react generally without additional activation. In order to accelerate the crosslinking reaction, however, it is also possible to use catalysts or to employ higher temperatures.

Examples of suitable crosslinkers are polyisocyanate crosslinkers, amide- and amine-formaldehyde resins, phenolic resins, aldehyde resins and ketone resins, such as phenol formaldehyde resins, resoles, furan resins, urea resins, carbamic ester resins, triazine resins, melamine resins, benzoguanamine resins, cyanamide resins, aniline resins, as described in "Lackkunstharze", H. Wagner, H. F. Sarx, Carl Hanser Verlag München, 1971. Preferred crosslinkers are polyisocyanates.

Polyisocyanates can be used with free and/or blocked isocyanate groups. Suitable such crosslinker resins include blocked polyisocyanates based for example on isophorone diisocyanate, hexamethylene diisocyanate, 1,4-diisocyanatocyclohexane, bis(4-isocyanatocyclohexane) methane or 1,3-diisocyanatobenzene or based on paint polyisocyanates such as polyisocyanates which contain biuret or isocyanurate groups and are derived from 1,6-diisocyanatohexane, isophorone diisocyanate or bis(4-isocyanatocyclohexane)methane or paint polyisocyanates which contain urethane groups and are based on 2,4- and/or 2,6-diisocyanatotoluene or isophorone diisocyanate on the one hand and low molecular weight polyhydroxyl compounds such as trimethylolpropane, the isomeric propanediols or butanediols or any desired mixtures of such polyhydroxyl compounds on the other.

Suitable blocking agents for the stated polyisocyanates are, for example, monohydric alcohols such as methanol, ethanol, butanol, hexanol, cyclohexanol, benzyl alcohol, oximes such as acetoxime, methyl ethyl ketoxime, cyclohexanone oxime, lactams such as $\epsilon$-caprolactam, phenols, amines such as diisopropylamine or dibutylamine, dimethylpyrazole or triazole, and also dimethyl malonate, diethyl malonate or dibutyl malonate.

Preference is given to the use of low-viscosity, hydrophobic or hydrophilicized polyisocyanates with free isocyanate groups based on aliphatic, cycloaliphatic, araliphatic and/or aromatic isocyanates, more preferably on aliphatic or cycloaliphatic isocyanates, since in this way it is possible to achieve a particularly high level of resistance in the coating film. The advantages of the binder dispersions of the invention are most clearly manifested in combination with these crosslinkers. These polyisocyanates generally have at 23° C. a viscosity of from 10 to 3500 mPas. If necessary the polyisocyanates can be employed as a blend of small amounts of inert solvents, in order to lower the viscosity to a level within the stated range. Triisocyanatononane as well can be used alone or in mixtures as a crosslinker component.

The water-dilutable polyurethane resin and the hydroxyl-free polyurethane dispersion described herein are generally of sufficient hydrophilicity, so that the dispersibility of the crosslinker resins, where the substances in question are not water-soluble or water-dispersible in any case, is ensured. Water-soluble or gap dispersible polyisocyanates are obtainable, for example, by modification with carboxylate, sulfonate and/or polyethylene oxide groups and/or polyethylene oxide/polypropylene oxide groups.

Hydrophilicization of polyisocyanates, for example, is possible by reaction with substoichiometric amounts of monohydric hydrophilic polyether alcohols. The preparation of hydrophilicized polyisocyanates of this kind is described for example in EP-A 0 540 985 (p. 3, line 55–p. 4 line 5). Also highly suitable are the polyisocyanates containing allophanate groups described in EP-A-0 959 087 (p. 3 lines 39–51), which can be prepared by reacting low-monomer-content polyisocyanates with polyethylene oxide polyether alcohols under allophanatization conditions. The water-dispersible polyisocyanate mixtures based on triisocyanatononane, as well, which are described in DE-A 100 078 21 (p. 2 line 66–p. 3 line 5) are suitable, as are polyisocyanates hydrophilicized with ionic groups (sulfonate groups, phosphonate groups), as described, for example, in DE-A 10 024 624 (p. 3 lines 13–33). A further possibility is that of hydrophilicization through the addition of commercially customary emulsifiers.

In principle it is of course also possible to use mixtures of different crosslinker resins.

As customary coatings auxiliaries and additives, which, as already described earlier on above, can be added both to the aqueous coating system before, during or after its preparation and to the binder or crosslinker components present in the said system, the following come into consideration for example: defoamers, thickeners, pigments, dispersing auxiliaries, dulling agents, catalysts, anti-skinning agents, anti-settling agents or emulsifiers and also adjuvants which are able to intensify the desired soft-feel effect.

The aqueous coating systems thus obtained, comprising the polyurethane resin of the invention, are suitable for all fields of use in which aqueous paint and coating systems with high requirements in terms of the surface quality resistance of the films are used, such as the coating of mineral construction material surfaces, varnishing and sealing of wood and wood materials, coating of metallic surfaces (metal coating), coating and varnishing of asphaltic or bituminous coverings, painting and sealing of various plastics surfaces (plastic coating) and also high-gloss coating materials. With preference, however, they are suitable for producing soft-feel effect coating materials which ensure good solvent resistance and, in particular, good resistance to suntan lotion (in the suntan lotion test). Coating materials of this kind are used with preference in the coating of plastics or in wood coating, where curing takes place normally at temperatures between room temperature and 130° C. The two-component technology with non-blocked polyisocyanate crosslinkers allows the use of comparatively low curing temperatures.

The aqueous coating systems comprising the water-dilutable polyurethanes of the invention are normally used in one-coat coating materials or in the clearcoat or topcoat (topmost coat) of multi-coat systems.

Further provided by the present invention are substrates coated with a crosslinked coating system comprising the water-dilutable polyurethane resins of the invention.

The coating can be produced by any of the various spraying methods, such as air pressure spraying, airless spraying or electrostatic spraying methods, for example, using one-component or, where appropriate, two-component spraying equipment. The coating materials and coating systems comprising the polyurethane resins of the invention can, however, also be applied by other processes, for example by brushing, rolling or knife coating.

EXAMPLES

The examples below are intended to illustrate the invention though without restricting it. All figures in % relate to weight, unless noted otherwise. Viscosity measurements are conducted in a cone and plate viscometer in accordance with DIN 53019 at a shear rate of 40 $s^{-1}$.

Example 1

Inventive

A 15-1 reaction vessel with stirrer, heating apparatus and water separator with cooling apparatus is charged with 1281 g of phthalic anhydride, 5058 g of adipic acid, 6387 g of hexane-1,6-diol and 675 g of neopentylglycol and these components are heated to 140° C. over one hour under nitrogen. Over a further 9 hours the mixture is heated to 220° C. and condensation is continued at this temperature until an acid number of less than 3 is reached. The polyester resin obtained in this way has a viscosity (determined as the flow time of an 80% strength solution of polyester in methoxypropyl acetate from the DIN 4 mm cup at 23° C. (Ford cup viscosity)) of 54 seconds and an OH number of from 160 mg KOH/g.

A 6-1 reaction vessel with cooling, heating and stirring apparatus is charged under a nitrogen atmosphere with 1560 g of the above-described polyester and this initial charge is heated to 130° C. together with 1520 g of a linear polyester carbonate diol of number-average molecular weight 2000 (Desmophen® VP LS 2391, Bayer A G Leverkusen, D E), 120 g of trimethylolpropane, 160 g of dimethylolpropionic acid, 1000 g of N-methylpyrrolidone and 5 g of tin(II) octoate and the mixture is homogenized for 30 minutes. It is then cooled to 80° C., 640 g of hexamethylene diisocyanate are added with vigorous stirring, and the mixture is heated (utilizing the reaction exotherm) to 140° C. and held at this temperature until NCO groups can no longer be detected.

The polyurethane obtained in this way is subsequently cooled to 90° C.–100° C., 53 g of dimethylethanolamine (degree of neutralization: 50%) are added, the polyurethane is diluted by addition of 280 g of N-methylpyrrolidone, and the mixture is homogenized. After cooling, a water-dilutable polyurethane resin is obtained having an OH content of 1.4% (on solid resin), an acid number of 18.5 mg KOH/g (on solid resin) and a viscosity of approximately 20000 mPas (23° C.; D=40 $s^{-1}$) with a solids content of 76% by weight. The resin solids have a carbonate group fraction O(C=O)O of 8.9% by weight.

Example 2

Not Inventive

"Hydroxy ester urethane B" according to EP-A 0 926 172 (p. 7, section [00640] to [0065]) 80% in N-methylpyrrolidone. The resin solids have a carbonate group fraction O(C=O)O of 4.7% by weight.

Example 3

Not Inventive

A 6-1 reaction vessel with cooling, heating and stirring apparatus is charged under a nitrogen atmosphere with 1170 g of the polyester from Example 1, which together with 1140 g of linear polyester carbonate diol of number-average molecular weight 2000 (Desmophen® VP LS 2391, Bayer A G, Leverkusen, D E), 90 g of trimethylolpropane, 120 g of dimethylolpropionic acid, 125 g of N-methylpyrrolidone and 3.8 g of tin(II)octoate is heated to 130° C. and the mixture is homogenized for 30 minutes. It is then cooled to 80° C., 480 g of hexamethylene diisocyanate are added with vigorous stirring, and the mixture is heated (utilizing the reaction exotherm) to 140° C. and held at this temperature until NCO groups can no longer be detected.

Subsequently the polyurethane obtained in this way is cooled to 90°–100° C., 39 g of dimethylethanolamine (degree of neutralization: 50%) are added, and the mixture is homogenized for 15 minutes and dispersed with 2270 g of demineralized water. The aqueous polyurethane resin dispersion obtained in this way has an OH content of 1.4% (on solid resin), an acid number of 18 mg KOH/g (on solid resin) and a viscosity of approximately 1500 mPas (23° C.; D=40 s$^{-1}$) with a solids content of 54.3% by weight. The resin solids have a carbonate group fraction O(C=O)O of 8.9% by weight.

Example 4

Polyurethane Dispersion 4 (Bayhydrol® PR 240, Bayer AG, Leverkusen)

Sulfonate-hydrophilicized, non-hydroxyl-containing, aliphatic-polyester-based polyurethane dispersion having a solids content of 40% by weight, an average particle size of approximately 200 nm at a pH of approximately 7; the dispersion is free from organic solvents.

Example 5

Polyurethane Dispersion 5

1700 parts by weight of a polyester diol formed from hexane-1,6-diol, 2,2-dimethylpropane-1,3-diol and adipic acid, of OH number 66, and 58.5 parts by weight of a polyether monoalcohol formed from N-butanol, ethylene oxide and propylene oxide (in an 83:17 molar ratio), of OH number 25, are dewatered at 100° C. under a vacuum of about 15 mbar. The vacuum is subsequently broken with nitrogen. Following the addition of 250 parts of N-methylpyrrolidone, 250 parts by weight of 1-isocyanato-3,3,5-trimethyl-5-isocyanatomethyl-cyclohexane (isophorone diisocyanate) and 190 parts by weight of hexamethylene diisocyanate the mixture is stirred at 100° C. until the isocyanate content is 4.4% by weight. After the mixture is cooled to 50–60° C., 3900 parts by weight of anhydrous acetone are added. The acetonic solution is cooled to 45° C. Then a mixture of 107 parts by weight of 1-amino-3,3,5-trimethyl-5-aminomethyl-cyclohexane (IPDA) in 210 parts by weight of anhydrous acetone is fed. The reaction is exothermic. After the exotherm has subsided, 22 parts by weight of sodium N-(2-aminoethyl)-2-aminoethanesulfonate and 5 parts by weight of hydrazine monohydrate in solution in 250 parts by weight of water are added. After subsequent stirring for 10 minutes 2700 parts of water are fed in slowly under vigorous stirring. A bluish white dispersion of the solid in a mixture of water and acetone is formed. Removal of the acetone by distillation leaves an aqueous dispersion having a solids content of 45±1% by weight.

The dispersion has an average particle size according to laser correlation spectroscopy of about 210 nm and Ford cup viscosity (DIN 4 mm cup) of 22 seconds. The hydroxyl-free polyurethane dispersion obtained has an organic cosolvents (N-methylpyrrolidone) content of approximately 4.5% by weight.

Use Example

Preparation of Soft-Feel Effect Paints

For preparing the paints 30.9 parts by weight of the polyurethane dispersion 4 (40% concentration) in three batches (1, 2, 3) are admixed with in each case 16.3 parts by weight of the water-dilutable polyurethane resin from Ex. 1 (76%), with 15.5 parts by weight of the water-dilutable polyurethane resin from Ex. 2 and with 22.8 parts by weight of the polyester-polyurethane dispersion from Ex. 3 (weight ratio of crosslinkable to non-functional resin in each case 50:50 based on resin solids). Additionally, for each batch 0.2 parts by weight of defoamer DNE (K. Obermayer, Bad Berleburg, Del.), 0.3 parts by weight of Tego® Wet KL 245 (50% in water; Tego Chemie, Essen, D E), 0.4 parts by weight of Byk® 348 (Byk Chemie, Wesel, D E), 1.2 parts by weight of Aquacer® 535 (Byk Chemie, Wesel, D E), 2.8 parts by weight of Silitin® Z 86 (Hoffmann & Söhne, Neuburg, D E), 4.3 parts by weight of Pergopak® M3 (Martinswerk, Bergheim, D E), 1.4 parts by weight of Talc IT Extra (Norwegian Talc, Frankfurt, Del.), 11.2 parts by weight of Bayferrox® 318 M (Bayer A G, Leverkusen, D E) and 18 parts by weight of demineralized water are dispersed in a bead mill to give an aqueous millbase. After a standing time of 16 h at room temperature, 1.4 parts by weight of dulling agent OK 412 Degussa, Frankfurt, Del.) are incorporated by means of a dissolver. Three further batches (4, 5, 6) are prepared, but using 27.5 parts by weight of the polyurethane dispersion 5 (45%) instead of polyurethane dispersion 4. All other components are used in the proportions already stated.

When using the polyurethane solutions from Ex. 1 or 2 an additional amount of demineralized water can be added for the purpose of setting the desired viscosity of the millbase or stock varnish. In this way a storage-stable aqueous stock varnish with a binder content of about 27.5%, a pigments and fillers content of about 20.5% and an additives content of about 2% is obtained. The pH is 7±0.5.

Incorporated into the stock varnish batch (1–6) subsequently, by means of a dissolver, is a 75% strength solution of polyisocyanate crosslinker Bayhydur® 3100 (Bayer A G, Leverkusen, D E) in methoxypropyl acetate, corresponding to an NCO:OH ratio of 1.5:1. The paint obtained in this way is applied by spraying to a plastic sheet (e.g. Bayblend® T 65 (polycarbonate/ABS blend), (dry film thickness 40 μm–50 μm) and after a flash-off time of 10 minutes the resulting film is dried at 80° C. for 30 minutes and then at 60° C. for 16 h. The result is a matt, uniform paint film which has a velvety soft feel ("soft-feel" haptic quality). Table 1 shows the coatings test results of the binder combinations 1–6.

TABLE 1

Technical results for the soft-feel coating materials in accordance with the use example

| Batch | OH-funct. dispersion | Non-funct. dispersion | Crosslinker | Haptic quality | Suntan lotion resistance 1 h 74° C.** |
|---|---|---|---|---|---|
| 1 | Ex. 1 | Ex. 4 | Bayhydur ® 3100 | 1–2 | 3 |
| 2 | Ex. 2 | Ex. 4 | Bayhydur ® 3100 | 1–2 | 4–5 |
| 3 | Ex. 3 | Ex. 4 | Bayhydur ® 3100 | 2–3 | 5 |
| 4 | Ex. 1 | Ex. 5 | Bayhydur ® 3100 | 2–3 | 2 |
| 5 | Ex. 2 | Ex. 5 | Bayhydur ® 3100 | 2 | 3–4 |
| 6 | Ex. 3 | Ex. 5 | Bayhydur ® 3100 | 2–3 | 3 |

*Assessment on a scale of 0–5 (0 = velvety, soft, warm touch sensation; 5 = hard, smooth, cold touch sensation)
**The resistance to suntan lotion and insect protectant ("Suntan Lotion Test") was tested in a method based on Ford Test/USA (Engineering material specification/soiling and cleanability FLTM BN 112-08, Iso 105-A02/AATCC). The test is carried out on a painted plastic sheet. A ring of glass (d = 19 mm ± 3 mm) is placed on the paint surface and 0.25 ml of suntan lotion ("Coppertone Kids", from Coppertone) is introduced using a syringe. Where the rheology of the suntan lotion does not cause it to spread by itself, it is spread using a suitable utensil in such a way that the area enclosed by the ring is wetted. The test specimen is then stored at RT or at 74° C. for 1 h and thereafter the ring is removed, the test areas being wiped with a cosmetics cloth. The assessment of the damage pattern is made visually on a scale of 0–5:
0 = no damage
1 = reversible damage (complete regeneration)
2 = spotting/loss of gloss/colour change
3 = isolated blisters or wrinkles
4 = wrinkles, blisters
5 = severe wrinkling/detachment from the subtrate/film destroyed The paints based on the water-dilutable, OH-containing polyurethane resin of the invention from Ex. 1, in combination both with PUR dispersion from Ex. 4 and with PUR dispersion from Ex. 5, with comparable haptic qualities, display a significantly better suntan lotion resistance, in comparison to the use of the non-inventive binders (Ex. 2, 3). Moreover, an improvement in the suntan lotion resistance is found in each case when using the non-functional polyurethane dispersion from Ex. 5 as compared with Ex. 4.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous coating system comprising
  a) at least one non-aqueous component comprising a water-dispersible polyurethane resin obtained by reacting
    A1) at least one polycarbonate polyol with a number average molecular weight of from 400 to 6000 Da,
    A2) optionally, a polyester polyol which is different from component (A1) with a number-average molecular weight $M_n$ of from 400 to 6000 Da,
    A3) optionally, a low molecular weight compound containing two or more hydroxy and/or amino groups having a molecular weight of from 60 to 400 Da,
    A4) optionally, a compound which is monofunctional in terms of reaction with NCO groups or which contains active hydrogen atoms differing in reactivity, these units being located in each case at the chain end of a polymer containing urethane groups,
    A5) at least one compound containing at least two isocyanate-reactive groups and at least one group capable of forming anions, and
    A6) one or more polyisocyanates,
    the resultant polyurethane resin containing from 5.8% to 20.0% by weight of incorporated carbonate groups —O(C=O)O— and being present in a solvent which is inert towards isocyanate groups,
  b) one or more aqueous binder components comprising at least one hydroxyl-free polyurethane dispersion,
  c) optionally, auxiliaries and additives and
  d) at least one crosslinker component.

2. The aqueous coating system according to claim 1, wherein the crosslinker component is hydrophobic or hydrophilicized polyisocyanates containing free isocyanate groups based on aliphatic, cycloaliphatic, araliphatic and/or aromatic isocyanates.

3. The aqueous coating system according to claim 2, wherein the crosslinker component is hydrophobic or hydrophilicized polyisocyanates containing free isocyanate groups based on aliphatic or cycloaliphatic isocyanates.

4. The process for preparing aqueous coating systems according to claim 1, further comprising incorporating the water-dilutable polyurethane resin into an aqueous phase comprising at least one hydroxyl-free aqueous polyurethane dispersion and, if desired, auxiliaries and additives and subsequently at least one crosslinker component and also, where appropriate, further auxiliaries and additives are dispersed into this aqueous stock varnish.

5. A method of coating, varnishing and sealing a substrate comprising applying the aqueous coating system according to claim 1 to the substrate, wherein the substrate is selected from mineral construction material surfaces, wood, wood materials, metallic surfaces, asphaltic coverings, bituminous coverings, and plastics surfaces.

6. A method of producing a soft-feel effect coating material comprising applying the aqueous coating system according to claim 1 to a substrate.

7. The method of claim 6, wherein the substrate is plastic or wood.

8. A substrates coated with a crosslinked coating system comprising the aqueous coating system according to claim 1.

* * * * *